(12) United States Patent
Kersnick et al.

(10) Patent No.: US 8,512,850 B2
(45) Date of Patent: Aug. 20, 2013

(54) CORRUGATING LINERBOARD, CORRUGATED BOARD, AND METHODS OF MAKING THE SAME

(75) Inventors: Charles R. Kersnick, Marietta, GA (US); Rodney T. Barron, Cumming, GA (US); Sandeep Kulkarni, Kingsport, TN (US); Brian J. Reilly, Atlanta, GA (US); Ernest Widner, Gainesville, GA (US)

(73) Assignee: Georgia-Pacific Corrugated LLC, Atlanta, GA (US)

( * ) Notice: Subject to any disclaimer, the term of this patent is extended or adjusted under 35 U.S.C. 154(b) by 815 days.

(21) Appl. No.: 12/561,545

(22) Filed: Sep. 17, 2009

(65) Prior Publication Data
US 2010/0086746 A1 Apr. 8, 2010

Related U.S. Application Data

(60) Provisional application No. 61/102,535, filed on Oct. 3, 2008.

(51) Int. Cl.
*B31F 1/20* (2006.01)
(52) U.S. Cl.
USPC ............ 428/182; 428/184; 156/205; 156/208
(58) Field of Classification Search
USPC .................. 428/182, 184, 425.1, 479.6, 511, 428/913; 156/205, 208
See application file for complete search history.

(56) References Cited

U.S. PATENT DOCUMENTS

| | | | |
|---|---|---|---|
| 1,795,542 A | 3/1931 | Schoo | |
| 3,524,759 A | 8/1970 | McConnell et al. | |
| 3,791,856 A * | 2/1974 | Duling et al. | 427/359 |
| 3,849,224 A | 11/1974 | Hintz et al. | |
| 3,892,613 A | 7/1975 | McDonald et al. | |
| 4,826,714 A * | 5/1989 | King | 428/34.2 |
| 4,871,406 A | 10/1989 | Griffith | |
| 5,439,707 A | 8/1995 | Nelli et al. | |
| 5,635,279 A | 6/1997 | Ma et al. | |
| 5,654,039 A * | 8/1997 | Wenzel et al. | 427/391 |
| 5,698,295 A | 12/1997 | Benner et al. | |
| 6,066,379 A | 5/2000 | Ma et al. | |
| 6,722,560 B2 | 4/2004 | Player et al. | |
| 6,743,478 B1 | 6/2004 | Kiiha et al. | |
| 6,811,824 B2 | 11/2004 | Hassan et al. | |

(Continued)

FOREIGN PATENT DOCUMENTS

| EP | 0340362 A1 | 11/1989 |
|---|---|---|
| EP | 1556313 B1 | 12/2006 |

(Continued)

OTHER PUBLICATIONS

PCT Search Report and Written Opinion for PCT/US2009/057262 Date Mailed Feb. 9, 2010.

*Primary Examiner* — Donald J Loney
(74) *Attorney, Agent, or Firm* — William W. Letson

(57) ABSTRACT

A method of making a corrugating linerboard includes supplying a web of coated linerboard having a first side, a second side and a thickness defined by a distance between the first side and the second side, the first side being coated with a moisture-repellant material; and impregnating the coated linerboard with a hydrophobic material from the second side such that the hydrophobic material penetrates into the thickness of the coated linerboard.

24 Claims, 2 Drawing Sheets

(56) References Cited

U.S. PATENT DOCUMENTS

| | | |
|---|---|---|
| 6,846,573 B2 | 1/2005 | Seydel |
| 6,890,982 B2 | 5/2005 | Borsinger et al. |
| 7,244,509 B1 | 7/2007 | Seydel |
| 7,267,743 B2 | 9/2007 | Borsinger et al. |
| 7,776,928 B2 | 8/2010 | Borsinger et al. |
| 7,910,758 B2 | 3/2011 | Hassan et al. |
| 2004/0076745 A1 | 4/2004 | Hassan et al. |
| 2005/0058700 A1 | 3/2005 | Wachter et al. |
| 2005/0123780 A1 | 6/2005 | Seydel |
| 2005/0131103 A1 | 6/2005 | Hassan et al. |
| 2005/0266167 A1 | 12/2005 | Berube |
| 2005/0287385 A1 | 12/2005 | Quick |
| 2006/0014901 A1 | 1/2006 | Hassan et al. |
| 2006/0196391 A1 | 9/2006 | Hassan et al. |
| 2007/0249771 A1 | 10/2007 | Paul et al. |
| 2007/0282000 A1 | 12/2007 | Murphy et al. |
| 2009/0036694 A1 | 2/2009 | Hassan et al. |
| 2009/0104314 A1 | 4/2009 | Dellinger et al. |
| 2009/0218347 A1 | 9/2009 | Helou, Jr. |
| 2010/0189961 A1 | 7/2010 | Bugas et al. |
| 2011/0008585 A1 | 1/2011 | Schuelke et al. |
| 2013/0042975 A1 | 2/2013 | Bugas et al. |

FOREIGN PATENT DOCUMENTS

| | | |
|---|---|---|
| EP | 1687382 B1 | 4/2007 |
| JP | 2000-108231 A | 4/2000 |
| WO | 96/00815 A1 | 1/1996 |
| WO | 2005/004686 A1 | 1/2005 |
| WO | 2008/082571 A2 | 7/2008 |
| WO | 2009/017909 A2 | 2/2009 |
| WO | 2009/055583 A1 | 4/2009 |
| WO | 2009/143552 A1 | 12/2009 |

* cited by examiner

CORRUGATING LINERBOARD, CORRUGATED BOARD, AND METHODS OF MAKING THE SAME

CROSS REFERENCE TO RELATED APPLICATIONS

This application claims priority to U.S. Provisional Application No. 61/102,535 filed Oct. 3, 2008, which is herein incorporated by reference in its entirety.

BACKGROUND

The present disclosure generally relates to corrugating linerboard, corrugated board and methods of making the corrugating linerboard and the corrugated board, and more particularly, to moisture-repellant corrugating linerboard, moisture-repellant corrugated board and methods of making the moisture-repellant corrugating linerboard and the moisture-repellant corrugated board.

Perishables, such as ice-packed chicken, seafood, and produce such as fruits and vegetables are typically shipped in boxes or other containers formed from corrugated board. In these high humidity and free water/moisture applications, typical uncoated corrugated board can become substantially weakened to the point where there is insufficient strength to safely store and ship perishables therein.

Accordingly, a continual need exists for improvements to moisture-repellant corrugated boards.

BRIEF SUMMARY

Disclosed herein are corrugating linerboards, corrugated boards, and method of making the corrugating linerboards and the corrugated boards.

In one embodiment, a method of making a corrugating linerboard comprises supplying a web of coated linerboard having a first side, a second side and a thickness defined by a distance between the first side and the second side, the first side being coated with a moisture repellant material; and impregnating the coated linerboard with a hydrophobic material from the second side such that the hydrophobic material penetrates into the thickness of the coated linerboard.

In one embodiment, a corrugating linerboard comprises a paperboard material having a first side, a second side, and a thickness defined by a distance between the first side and the second side; a water-based coating disposed on the first side of the paperboard material; and a hydrophobic material impregnated into the thickness of the paperboard.

In one embodiment, a method of making a corrugated board comprises supplying a web of a first coated linerboard having a first side, a second side and a thickness defined by a distance between the first side and the second side, wherein the first side is coated with a first moisture repellant material, and wherein a hydrophobic material is impregnated into the thickness of the first coated linerboard; forming a fluted paper medium from a corrugating medium; supplying a web of a second coated linerboard having a first side, a second side and a thickness defined by a distance between the first side and the second side, wherein the first side is coated with a second moisture repellant material, and wherein a second hydrophobic material is impregnated into the thickness of the second coated linerboard; and bonding the first and second coated linerboards to the fluted paper medium.

In one embodiment, a corrugated board comprises a first coated linerboard having a first side, a second side and a thickness defined by a distance between the first side and the second side, wherein the first side is coated with a water-based coating and a hydrophobic material is impregnated into the thickness of the first coated linerboard; a fluted paper medium; and a second coated linerboard having a first side, a second side and a thickness defined by a distance between the first side and the second side, wherein the first side is coated with a second water-based coating and a second hydrophobic material is impregnated into the thickness of the second coated linerboard.

In one embodiment, a corrugated board comprises a first linerboard having a first side, a second side and a thickness defined by a distance between the first side and the second side, wherein the first side comprises a moisture repellant layer that is substantially free of wax, and wherein a hydrophobic material is impregnated into the thickness of the first coated linerboard; a fluted paper medium; and a second linerboard having a first side, a second side and a thickness defined by a distance between the first side and the second side. In one embodiment, a method of making a corrugating linerboard comprises supplying a web of paperboard having a first side, a second side and a thickness defined by a distance between the first side and the second side; impregnating the paperboard from the first side with a hydrophobic material such that the hydrophobic material penetrates a portion of a thickness to form a partially impregnated paperboard; and coating the partially impregnated paperboard with a water based coating on the second side.

The above described and other features are exemplified by the following Figures and detailed description.

BRIEF DESCRIPTION OF THE DRAWINGS

Referring to the exemplary drawings wherein like elements are numbered alike in the several Figures.

DETAILED DESCRIPTION

Disclosed herein are corrugating linerboards, corrugated boards, and method of making the corrugating linerboards and the corrugated boards. Particularly, it is has unexpectedly been discovered that effective water-repellant corrugated board can be produced by employing a corrugating linerboard that has a moisture-repellant layer and has been impregnated with a hydrophobic material.

As used herein, the term "moisture-repellant" merely refers to the hydrophobic character of a material (e.g., a coating) and its tendency to repel, block or not significantly absorb or transmit liquids in normal use. Thus, the term "moisture-repellant" is intended to include "moisture-resistant" and other terminology which connotes substantial as opposed to total or complete water blocking properties, and refers to a water-blocking property which is sufficient for the intended use requiring a degree of moisture-repellency.

Figure 1:
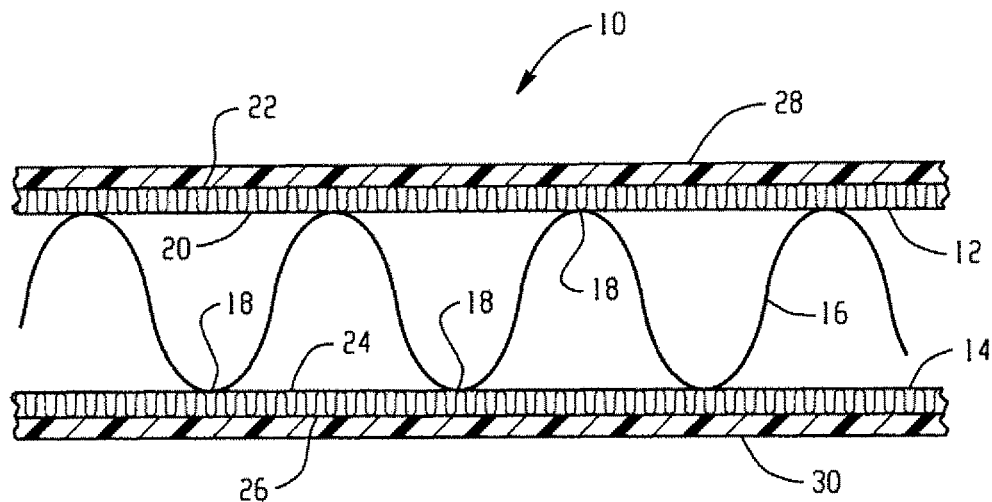
FIG. 1 is a cross-sectional view of an embodiment of a moisture-repellant corrugated board.

Referring now to FIG. 1, an embodiment of a corrugated board, generally designated 10 is illustrated. Without wanting to be bound by theory, the corrugated board 10 is particularly suited for ice-pack and hydrocooling applications that are exposed to a relatively high amount of free liquid moisture. The corrugated board 10 comprises a first corrugating linerboard 12, a second corrugating linerboard 14, and a corrugated medium 16 disposed therebetween. The corrugated medium can be bonded to the linerboards 12 and 14 by any suitable methods. For example, in one embodiment, an adhesive is used and located at the tips 18 of the flutes of corrugated medium 16 to bond linerboards 12 and 14 the to corrugated medium 16. In other embodiments, a starch bond can be used to bond linerboards 12 and 14 to corrugated medium 16, or a resin, such as Dacrez® resin from National Adhesives can be used as an additive to the starch in order to provide increased water/moisture resistance to the starch bond.

Linerboard 12 comprises a first side 22 and second side 20 with a thickness defined by the space between the first side 22 and the second side 20. A moisture-repellant layer 28 is disposed on the first side 22. The moisture-repellant layer 28 can be applied as a coating, as a laminate, as a polymer film extrudate, or any other suitable method. In one exemplary example, the moisture-repellant layer is applied as a coating, specifically a water-based coating. The amount of water-based coating can vary depending on the application. In one embodiment, the coating is applied at about 2 to 6 lb/MSF. The term "water-based" is being used throughout this disclosure to generically describe coatings in which water is the main liquid component of the coating. While the resulting coating will be free of water, the term "water-based" coating is also used throughout this disclosure to describe the resulting film/coating formed from a "water-based" coating.

Exemplary water-based coatings include, but are not limited to, those formulations based on SBR (styrene butadiene) polymers. For example, the coatings include, but are not limited to, Vapor Coat® 340 and Michem® Coat 415 from Michelman, Inc., Tykote® 1024 from Dow-Reichhold, EC442 from Enviro-coatings, Novacote PC® 550G97 and Novacote PC® 550G00 from GP Chemicals. SpectraGuard® 3003 from Spectra-Kote Corp. and Cartaseal® HFU from Clariant Corp.

Optionally, the water-based coating can comprise a pigment. Such pigment coatings advantageously allow a reduction in the amount of the coating needed and thus minimize the weight of coating. These pigments provide increased stiffness to linerboard (e.g., 12) while maintaining or improving barrier performance and reducing coating cost when compared to coatings without the pigment. It is believed that the increased stiffness arises from stacking/alignment of the pigment platelets parallel to the surface of linerboards, similar to the stacking of bricks in a wall, resulting in an I-beam like effect. With a higher aspect ratio, i.e. platiness, of the pigment, the increase in stiffness becomes more pronounced.

In one embodiment, the weight of the pigment used in a coating formulation is about 30% to 70%, more specifically 40% to 60%, based on the weight of the pure polymer coating. Suitable pigments include, but are not limited to, the following inorganic materials: aluminum trihydrate, barium sulfate, calcium carbonate, mica (potassium aluminum silicates), nepheline syenite (sodium potassium aluminosilicate), finely ground silica sand and other natural and synthetic type of silicates, talc (magnesium silicates), wollastonite (calcium metasilicates), bentonite (montmorillonite, smectite) and clay. In particular embodiments, a high aspect ratio (platy clay) can be used as a pigment. Exemplary pigments include those high aspect ratio (platy) clays sold under the brandnames Barrisurf® HX and Barrisurf® LX from Imerys Corp. and Translink® 77 hydrophobic kaolins from BASF Corp.

The linerboard 12 further comprises a hydrophobic material impregnated into its thickness form the second side 20. It is to be understood that the term "impregnated", and its various forms, refers to a material that at least partially fills interstices of a substrate. For example, a material can be present at least 10% into the thickness of the substrate. In other embodiments, the material can completely till the thickness of the substrate.

In one embodiment, the corrugated medium 16 also comprises a hydrophobic material impregnated into its thickness. The hydrophobic material employed in the corrugated medium 16 can be the same or different material used as the hydrophobic material. Moreover, in some embodiments, the hydrophobic material can include those materials used in moisture-resistant layer 28. Suitable hydrophobic materials include, but are not limited to, paraffin waxes, other petroleum based waxes, polymers such as polyethylene, polymerized acrylics, vinyls, styrenes, ethylenes and copolymers of hetero-polymers of these polymers.

In embodiments, where it is desired that the corrugated board 10 be repulpable and recyclable, alternatives to paraffin waxes may be desired. For example, the hydrophobic material can include those materials made from any vegetable or animal oil suitable for hydrogenation. Sources of such oils or fats include beef tallow, pork lard, poultry greases, fish oils, and the oils of coconut, palm, castor, olive, cottonseed, linseed, peanuts, soy, corn, palm kernel, and canola. In one embodiment, the hydrophobic material comprises Chem-Corr® animal fat based wax from Chemol. It is possible to use blends of paraffin waxes with pigments such as clay, to extend the paraffin wax. The wax blends can be produced by incorporating 0 to 30% by weight of the vegetable oil wax into a standard paraffin-based impregnating wax. The extended waxes can be produced by incorporating 0 to 30% by weight of a pigment into a standard paraffin-based impregnating wax. The process of impregnating liners and mediums with the alternative waxes, blends and extended waxes is identical to the process typically used for impregnation with paraffin waxes, with the added advantage of being derived, either partially or completely from renewable resources. In addition, some of these alternative waxes, blends and extended waxes may be repulpable and recyclable. Finally, these materials may also provide a cost advantage over conventional paraffin waxes.

Turning back to linerboard 14, the linerboard 14 comprises a first side 26 and second side 24 with a thickness defined by the space between the first side 26 and the second side 24. A moisture-repellant layer 30 is disposed on the first side 26. The moisture-repellant layer 30 can be applied in a similar fashion as moisture-repellant layer 28. In one exemplary embodiment, the moisture-repellant layer is applied as a coating, specifically a water-based coating. Suitable water-based coatings include those listed above and may also optionally include a pigment as mentioned above. The moisture-repellant layer 30 can comprise the same or a different composition than moisture-repellant layer 28.

Figure 2:
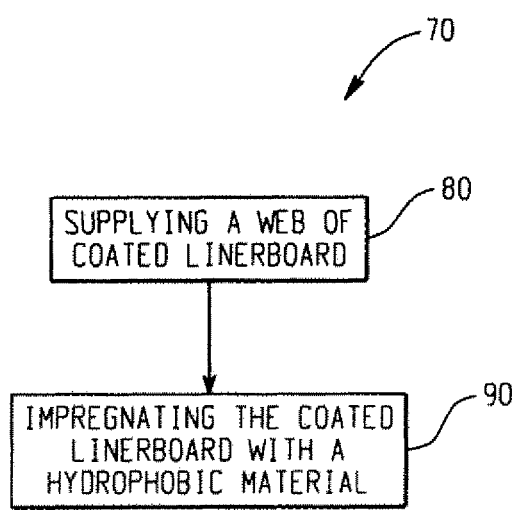
FIG. 2 is a block diagram of an exemplary method of making a moisture-repellant corrugating linerboard.

An exemplary method of making linerboards 12, 14 comprising a water-based coating is illustrated at FIG. 2. The method, generally designated 70 shows at block 80 supplying a web of coated linerboard that has a moisture-repellant material disposed on a first side; and at block 90 impregnating the coated linerboard with a wax material from the second side such that wax material penetrates into the thickness of the coated linerboard. In this example, the linerboards have previously been pre-coated with the water-based coating. However, embodiments are envisioned where the coating is applied "on-line" as part of a continuous process. One advantage of pre-coating the linerboard with the water-based coating, however, is that the linerboard 12 would simply need to be unwound from a roll.

In this method the coating acts as a type of barrier for the hydrophobic material (e.g., wax or wax alternative) that is impregnated from the second side 20. The hydrophobic material can be applied to the second side by any suitable impregnation method. For example, in one embodiment, the coated linerboard travels through a bath of hot melted hydrophobic material, which can be equipped with opposing squeezing or dressing rolls that force the hydrophobic material into the second side of the coated linerboard and remove the excess which falls back into the bath. As should readily be understood, this method is completely the opposite of currently known processes (e.g., wax cascade, wax curtain coating, and wax spray coating).

In a typical wax cascade process for corrugated boxes paraffin waxes and wax based compounds are traditionally applied to semi-formed boxes that are placed on conveyor mounted wire frames and conveyed under a waterfall or cascade of hot molten product, after which the boxes continue through a cooling tunnel supplied with refrigerated air as a means of solidifying the coating. In contrast to a wax cascading, the method disclosed herein provides a means for moisture treating the linerboard used in making corrugated boards, which resulting in a moisture-repellant corrugated board.

In a typical curtain coating process for corrugated boxes, paraffin waxes and wax based compounds are traditionally applied to semi-formed boxes on a die cutting machine that first cuts the form for the box from a corrugated sheet, folds it into a collapsed flat form, and then places it on a conveyor which carries the box under a curtain of hot molten product that issues from a side-to-side slit at the end of the melted product delivery pipe, after which the boxes may continue through a cooling tunnel supplied with refrigerated air as a means of solidifying the coating, and may or may not be flipped or inverted to expose the uncoated side to a second curtain coater on a second pass. In contrast to curtain coating, the method disclosed herein provides a means for moisture treating the linerboard used in making corrugated boards, which resulting in a moisture-repellant corrugated board.

In a typical wax spraying process for corrugated boxes, paraffin waxes and wax based compounds are traditionally applied to semi-formed boxes on a die cutting machine that first cuts the form for the box from a corrugated sheet, folds it into a collapsed flat form, and then places it on a conveyor which carrier the box under one or a bank of several spray heads that are heated to temperatures sufficient to assure that the molten product remains fluid until it has contacted and semi-penetrated the box linerboard substrate, after which the boxes continue through a cooling tunnel supplied with a refrigerated air as a means of solidifying the coating, and may or may not be flipped or inverted to present the uncoated side to a second spray coater on a second pass. In contrast to wax spraying, the method disclosed herein provides a means for moisture treating the linerboard used in making corrugated boards, which resulting in a moisture-repellant corrugated board.

Figure 3:
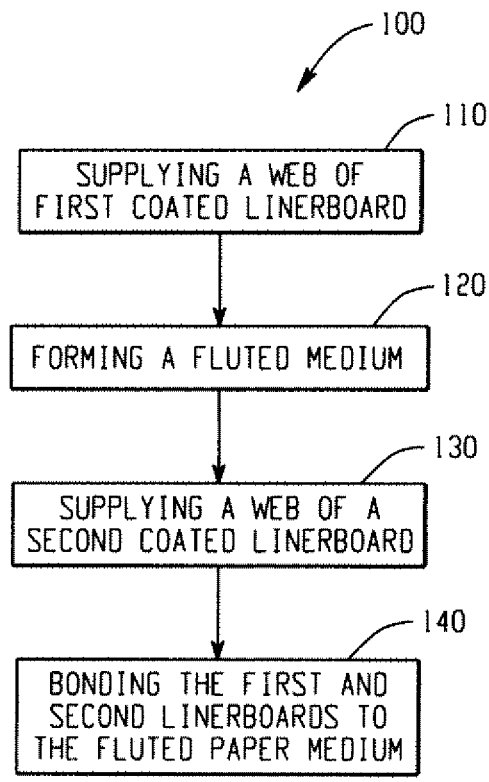
FIG. 3 is a block diagram of an exemplary method of making a moisture-repellant corrugated board.

Turning now to FIG. 3, an embodiment of a method of making a corrugated board generally designated 100 is illustrated. The method comprises at block 110 supplying a web of a first coated linerboard having a first side, a second side and a thickness defined by a distance between the first side and the second side, wherein the first side is coated with a first moisture repellant material, and wherein a hydrophobic material is impregnated into the thickness of the first coated linerboard. The method comprises, at block 120, forming a fluted paper medium from a corrugating medium; at block 130, supplying a web of a second coated linerboard having a first side, a second side and a thickness defined by a distance between the first side and the second side, wherein the first side is coated with a second moisture repellant material, and wherein a second hydrophobic material is impregnated into the thickness of the second coated linerboard; and, at block 140, bonding the first and second coated linerboards to the fluted paper medium.

Figure 4:
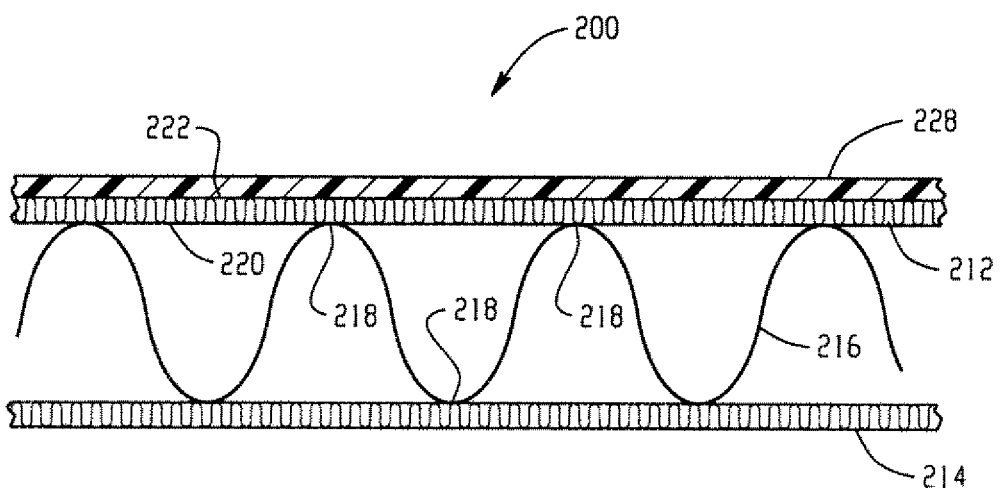
FIG. 4 is a cross-sectional view of an embodiment of a moisture-repellant corrugated board.

Referring now to FIG. 4, an embodiment of a corrugated board, generally designated 200 is illustrated. The corrugated board 200 comprises a first corrugating linerboard 212, a second corrugating linerboard 214, and a corrugated medium 216 disposed therebetween. The corrugated medium can be bonded to the linerboards 212 and 214 by any suitable methods including those discussed above in relation to corrugated board 10 (FIG. 1). The linerboard 212 further comprises a hydrophobic material impregnated into its thickness form the second side 220. Suitable hydrophobic materials include those discussed above in relation to linerboard 12 (FIG. 1). FIG. 4 illustrates an embodiment that may be useful in environments that have less free moisture compared to ice-pack or hydrocooling applications.

Various other embodiments are envisioned depending on the desired application. For example, a printing can be disposed on a linerboard with a moisture repellant layer disposed over the printing, which can prevent the printing from being rubbed off during transportation, which may be advantageous in meeting U.S.D.A. requirements for packaging in food contact. In other embodiments, multiple moisture repellant layers may be disposed over another moisture repellant layer. In yet other embodiments, linerboards and corrugated medium can also be treated with standard papermaking treatments to provide additional water-resistance and anti-wicking properties. Such treatments can be applied at the wet end of the paper machine or by means of a spray application on a preformed sheet or both. The treatments applied at the paper machine include rosin sizing, alkyl ketene dimer (AKD) sizing, alkenyl succinic anhydride (ASA) sizing, starch, latexes or wax emulsions.

EXAMPLE

In this example, samples of standard uncoated USP120 linerboard were compared to samples of similar linerboard double coated with a moisture resistant coating and samples of the same linerboard having one side double coated with a moisture resistant coating and the other side of that linerboard impregnated with wax. The samples were subjected to a standard ring crush test according to TAPPI standard T 822, both in a dry environment and at high humidity, i.e. at 90% relative humidity and 45 degrees Fahrenheit for at least about 24 hours. As shown below, the coated linerboard shows an improvement in strength over uncoated linerboard both in the dry environment and at high humidity.

|  | Coating B #/MSF | Top Coat #/MSF | Wax Impregnation #/MSF | TAPPI Ring Crush | 45/90 Ring Crush |
|---|---|---|---|---|---|
| USP120 | 0 | 0 | 0 | 118 | 59 |
| USP120 + Double Coating | 2.1 | 1.5 | 0 | 134 | 68 |
| USP120 + Double Coating + Wax | 2.1 | 1.5 | 21 | 175 | 113 |

Coating B (base coat): 50/50 Barrisurf ® HX and Tykote ® 1004
Top Coat: 100% Tykote ® 1004
Wax: Standard paraffin impregnating wax from ExxonMobil While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of making a corrugated linerboard comprising:
    supplying a web of a paperboard material having a first side, a second side, and a thickness defined by a distance between the first side and the second side, wherein the thickness of the paperboard material is corrugated, and wherein the first side is coated with a moisture-repellant material; and
    impregnating the paperboard material with a hydrophobic material from the second side such that the hydrophobic material penetrates into the thickness of the paperboard material.

2. The method of claim 1, wherein supplying the web of the paperboard material comprises coating the first side of the paperboard material with the moisture-repellant material.

3. The method of claim 2, wherein supplying the web of the paperboard material comprises unrolling the paperboard material to form the web of the paperboard material.

4. The method of claim 1, wherein the moisture-repellant material is disposed over printing on the first side of the paperboard material.

5. The method of claim 1, wherein the moisture-repellant material is a water-based coating.

6. The method of claim 5, wherein the moisture-repellant material comprises a pigment.

7. The method of claim 1, wherein the moisture-repellant material comprises multiple layers.

8. A corrugated linerboard comprising:
    a paperboard material having a first side, a second side, and a thickness defined by a distance between the first side and the second side, wherein the thickness of the paperboard material is corrugated;
    a water-based coating disposed on the first side of the paperboard material; and
    a hydrophobic material impregnated into the thickness of the paperboard material.

9. The corrugated linerboard of claim 8, wherein the water-based coating comprises a pigment.

10. A method of making a corrugated board comprising:
    supplying a web of a first linerboard having a first side, a second side, and a thickness defined by a distance between the first side and the second side, wherein the thickness of the first linerboard is corrugated, wherein the first side of the first linerboard is coated with a first moisture-repellant material, and wherein a first hydrophobic material is impregnated into the thickness of the first linerboard;
    forming a corrugated paper medium;
    supplying a web of a second linerboard having a first side, a second side, and a thickness defined by a distance between the first side and the second side, wherein the thickness of the second linerboard is corrugated, wherein the first side of the second linerboard is coated with a second moisture-repellant material, and wherein a second hydrophobic material is impregnated into the thickness of the second linerboard; and
    bonding the first and second linerboards to the corrugated paper medium.

11. The method of claim 10, wherein the first and second moisture-repellant materials are water-based coatings.

12. The method of claim 11, wherein the first and second moisture-repellant materials comprise a pigment.

13. A corrugated board, comprising:
    a first linerboard having a first side, a second side, and a thickness defined by a distance between the first side and the second side, wherein the thickness of the first linerboard is corrugated, wherein the first side of the first linerboard is coated with a first water-based coating, and wherein a first hydrophobic material is impregnated into the thickness of the first linerboard;
    a second linerboard having a first side, a second side, and a thickness defined by a distance between the first side and the second side, wherein the thickness of the second linerboard is corrugated, wherein the first side of the second linerboard is coated with a second water-based coating, and wherein a second hydrophobic material is impregnated into the thickness of the second linerboard; and
    a corrugated paper medium positioned between the first linerboard and the second linerboard.

14. The corrugated board of claim 13, wherein the water-based coating of the first linerboard comprises a pigment.

15. The corrugated board of claim 14, wherein the pigment comprises about 30% by weight to about 60% by weight of the water-based coating of the first linerboard.

16. The corrugated board of claim 13, wherein the water-based coating of both the first and second linerboard comprise a pigment.

17. The corrugated board of claim 13, wherein the corrugated board is repulpable.

18. The corrugated board of claim 13, wherein the water-based coating of the first linerboard is comprised of two layers.

19. The corrugated board of claim 18, wherein the water-based coating of the second linerboard is comprised of two layers.

20. The corrugated board of claim 13, wherein the corrugated paper medium is impregnated with a hydrophobic material.

21. A corrugated board, comprising:
    a first linerboard having a first side, a second side, and a thickness defined by a distance between the first side and the second side, wherein the thickness of the first linerboard is corrugated, wherein the first side comprises a moisture-repellant layer that is substantially free of wax, and wherein a hydrophobic material is impregnated into the thickness of the first linerboard;
    a corrugated paper medium; and
    a second linerboard having a first side, a second side, and a thickness defined by a distance between the first side and the second side, wherein the thickness of the second linerboard is corrugated.

22. The corrugated board of claim 21, wherein the first side of the second linerboard comprises a moisture-repellant layer; and a second hydrophobic material is impregnated into the thickness of the second linerboard.

23. The corrugated board of claim 21, wherein the moisture-repellant layer of the first linerboard comprises an extruded polymeric film.

24. A method of making a corrugated linerboard comprising:
- supplying a web of paperboard having a first side, a second side, and a thickness defined by a distance between the first side and the second side, wherein the thickness of the paperboard is corrugated;
- impregnating the paperboard from the first side with a hydrophobic material such that the hydrophobic material penetrates a portion of the thickness to form a partially impregnated paperboard; and
- coating the partially impregnated paperboard with a water-based coating on the second side.

* * * * *